United States Patent [19]

Yamamoto et al.

[11] Patent Number: 5,079,963
[45] Date of Patent: Jan. 14, 1992

[54] FEED SCREW DEVICE

[75] Inventors: Nobuhiro Yamamoto, Toyohashi; Kazunori Ikeda; Tosho Kato, both of Kosai, all of Japan

[73] Assignee: Asmo Co., Ltd., Shizuoka, Japan

[21] Appl. No.: 607,534

[22] Filed: Nov. 1, 1990

[30] Foreign Application Priority Data

Nov. 17, 1989 [JP] Japan .................................. 1-300562

[51] Int. Cl.⁵ .............................................. F16H 25/90
[52] U.S. Cl. .................................... 74/89.15; 74/459
[58] Field of Search .................... 74/89.15, 458, 459

[56] References Cited

U.S. PATENT DOCUMENTS

| | | | |
|---|---|---|---|
| 2,151,191 | 3/1939 | Crane et al. | 74/458 X |
| 2,545,879 | 3/1951 | Frentzel | 74/424.8 |
| 2,637,550 | 5/1953 | Ritter | 74/458 |
| 3,049,936 | 8/1962 | Schnell | 74/458 |
| 3,203,102 | 8/1965 | Petion | 74/458 |
| 3,534,626 | 10/1970 | Elliott et al. | 74/424.8 |
| 3,572,153 | 7/1970 | Dove | 74/458 X |
| 3,774,295 | 11/1973 | Conlie | 73/458 X |
| 3,845,669 | 11/1974 | Pickup | 74/458 X |
| 4,226,129 | 10/1980 | Henderson | 74/89.15 |
| 4,227,426 | 10/1980 | Schwanz et al. | 74/459 X |
| 4,685,344 | 8/1987 | Horn et al. | 74/89.15 X |

FOREIGN PATENT DOCUMENTS

2311500 8/1974 Fed. Rep. of Germany .
3028543 2/1982 Fed. Rep. of Germany .

*Primary Examiner*—Leslie A. Braun
*Assistant Examiner*—Ryan W. Massey
*Attorney, Agent, or Firm*—Venable, Baetjer, Howard & Civiletti

[57] ABSTRACT

In a feed screw device according to the present invention, a coil member is disposed on the outer periphery of a rotary shaft member. The coil member is formed of an elastic body such as a piece of piano wire. The coil member is mounted at least partially on the shaft member so as to have at least a portion remaining in a free state. The coil member is used to engage a nut placed on the outer periphery of the shaft member. When the shaft member is rotated, the coil member is also rotated together with the shaft member, so that the nut is moved in the axial direction of the feed screw. When the nut is brought into contact with a stopper by a driving force, the nut impactively strikes the stopper. However, since the coil member can be elastically deformed in the axial direction, the coil member is elastically deformed to absorb its impact. Also the "spring back" effect enabled by the deformable coil member serves as a contribution to the initiation of movement of the nut in the reverse direction. Thus, when the direction of the driving force is reversed, the nut can immediately be moved in the reverse direction by a slight driving force.

22 Claims, 5 Drawing Sheets

FEED SCREW DEVICE

BACKGROUND OF THE INVENTION

1) Field of the Invention

The present invention relates to a feed screw device for driving a reciprocating mover, and particularly to a feed screw device suitable for use in, for example, a cleaning apparatus for a wire-type static eliminator or discharger employed in an electrostatic recording apparatus, and the like.

2) Description of the Related Art:

Heretofore, feed screws have been known in which spiral grooves or projections are formed on a shaft-shaped member by machining such as cutting and rolling to be used as threaded portions.

In addition, simple feed screws with no need for accuracy are also known wherein wire members are spirally wound on shaft-shaped members and fixed thereon over the entire length thereof.

In the above-described conventional feed screws, the threaded portions are constructed as rigid portions. Thus, the concept that the threaded portions be deformed is contradictory to common sense.

However, one example is known where a reciprocating mover to be carried by a feed screw is caused to collide with a stopper at the stroke ends of a driving action or the like so as to stop its movement. In this case, threaded portions of the feed screw and of a feed nut bite into one another due to impact force produced by the collision, or an excessive force is exerted on a reduction mechanism used for rotating and driving the feed screw. By way of example, when a simple worm gear system is employed in such a reduction mechanism, a worm shaft or the output shaft of a motor connected directly to the worm shaft is brought into a state in which an excessive thrust load is applied thereon, thus leading to difficulty in a subsequent reverse startup of the motor.

SUMMARY OF THE INVENTION

With the foregoing problems in view, it is an object of the present invention to provide a feed screw device with a buffer function.

According to the feed screw device of the present invention, a cylindrical coil member is disposed around the outer periphery of a rotary shaft member and only a part of the coil member is mounted on the shaft member. Since the coil member is formed of an elastic body such as a piece of piano wire, parts of the coil other than the part mounted on the shaft member can be elastically deformed in the axial direction. This coil member is used to engage a nut placed on the outer periphery of the shaft member. When the shaft member is rotated, the coil member is also rotated together with the shaft member, so that the nut is moved in the axial direction along the shaft. Where the nut is brought into contact with the stopper at the stroke ends by a driving force, the nut impactively strikes the stopper. However, the coil member is elastically deformed in the axial direction to absorb this impact. Thus, no excessive thrust load is exerted on the output shaft of the motor or the like. In addition, when the direction of the driving force is reversed, the nut can be moved immediately in the reverse direction by a slight driving force. The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 1:
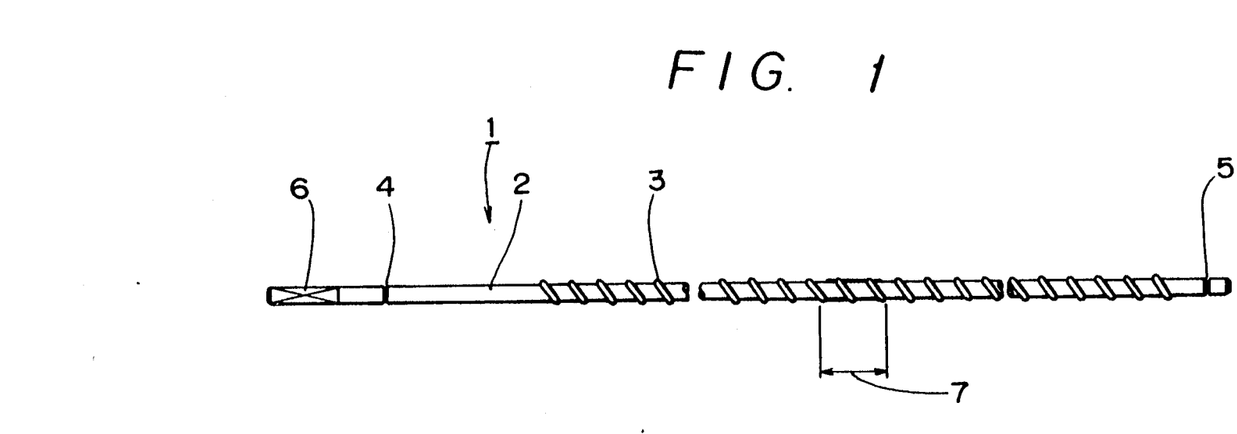
FIG. 1 is a front view showing a feed screw device according to one embodiment of this invention.

A preferred embodiment of this invention will hereinafter be described with reference to the accompanying drawings. FIG. 1 is a front view showing a feed screw 1 employed in a cleaning apparatus for a wire-type static eliminator, which is suitable for an electrostatic image recording or copying apparatus. The feed screw 1 is assembled by inserting a shaft 2 into a coil-shaped spring member 3 wound at loose pitch intervals (distance between the threads). The coil-shaped spring member 3 is produced by winding, helically at rough pitch intervals, wire members having elasticity such as piano wire, steel wire or stainless wire whose diameter is on the order of 0.3 to 2 mm. Preferably, coil-shaped spring member 3 is formed such that the lead angles of the coil loops thereof and the lead or pitch between loops thereof are of a predetermined size, so that the coil loops are arranged at constant intervals over the entire length of the shaft 2, predominantly in a free state. The coil-shaped spring member 3 is flexible due to its elasticity. The shaft 2 is formed of a member made by drawing stainless-steel, and has an outer diameter somewhat smaller than the inner diameter of the coil-shaped spring member 3. Ring-like grooves 4, 5 for bringing snap washers into engagement therewith ar formed around respective ends of the shaft 2, at positions adjacent to the ends thereof. A flat surface 6 is formed at one of the ends in order to engage a drive shaft of a drive unit. The shaft 2 is inserted into the inside of the cylindrical coil-shaped spring member 3. The coil-shaped spring member 3 is soldered to the shaft 2 only at the central portion 7 of the length thereof.

Figure 2:
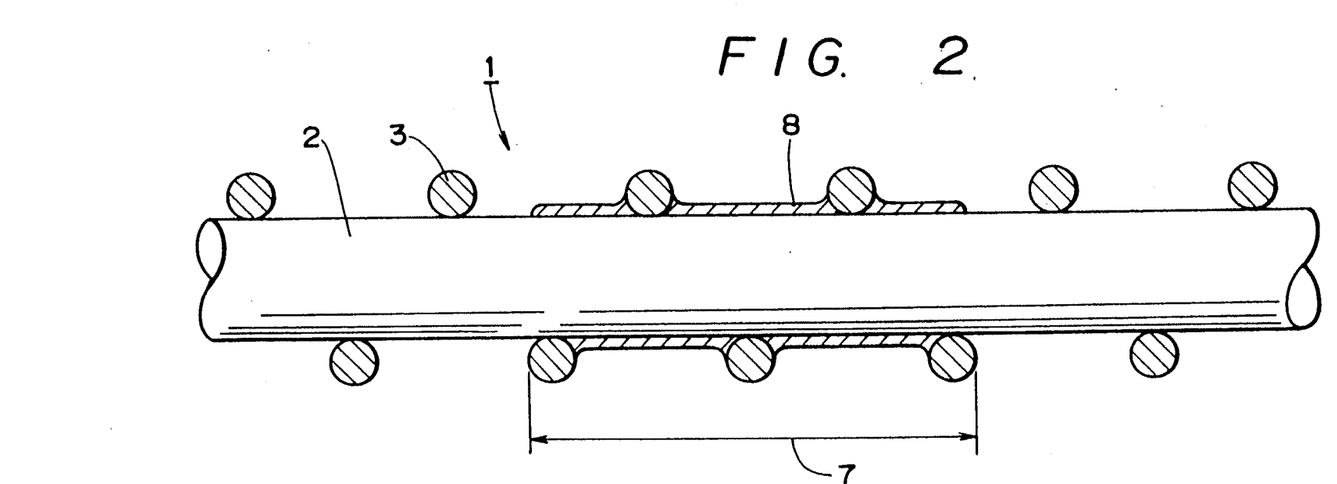
FIG. 2 is an enlarged cross-sectional view depicting a fixing portion of a coil-shaped spring member used for the feed screw device shown in FIG. 1.

FIG. 2 is a longitudinal cross-sectional view showing the soldered central portion 7 of the feed screw. The wire members used for the coil-shaped spring member 3 are soldered and fixed on the shaft 2 by a soldering member 8 only over a short span at the central portion 7 of the shaft where the coil-shaped spring member 3 is wound two or three times. It is preferable to fix the soldered portion 7 to the shaft 2 over the length of at least one turn around the outer periphery of the shaft 2. As the coil-shaped spring member 3 is fixed to the shaft, it rotates integrally with the shaft 2. However, both ends of the coil-shaped spring member 3 can be expanded or contracted due to the elastic deformation. Only the soldered central portion 7 may not be deformed. The coil-shaped spring member 3 has rigidity enough not to deform elastically when a nut 25 is carried appropriately by the rotation of the shaft 2.

In sum, the feed screw 1 is comprised of the shaft 2 and the surrounding coil-shaped spring member 3. The coil-shaped spring member 3, partially fixed on the shaft 2, comprises a threaded portion of the feed screw to be brought into engagement with a feed nut 25.

Figure 3:
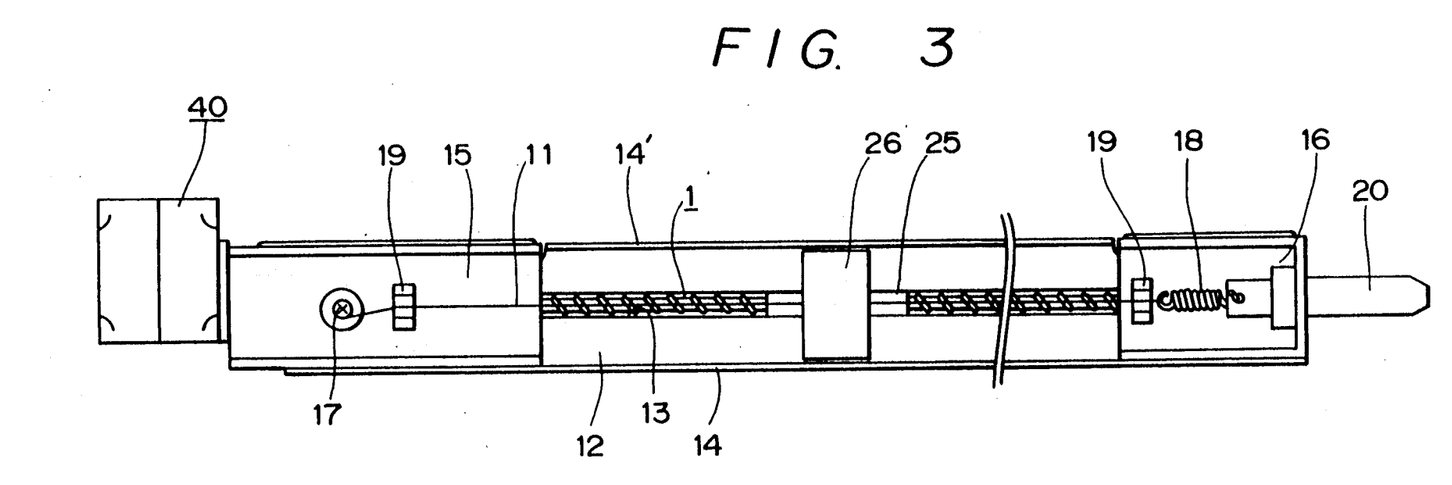
FIG. 3 is a plan view illustrating a cleaning apparatus for a wire type static eliminator to which the present invention is applied.
Figure 4:
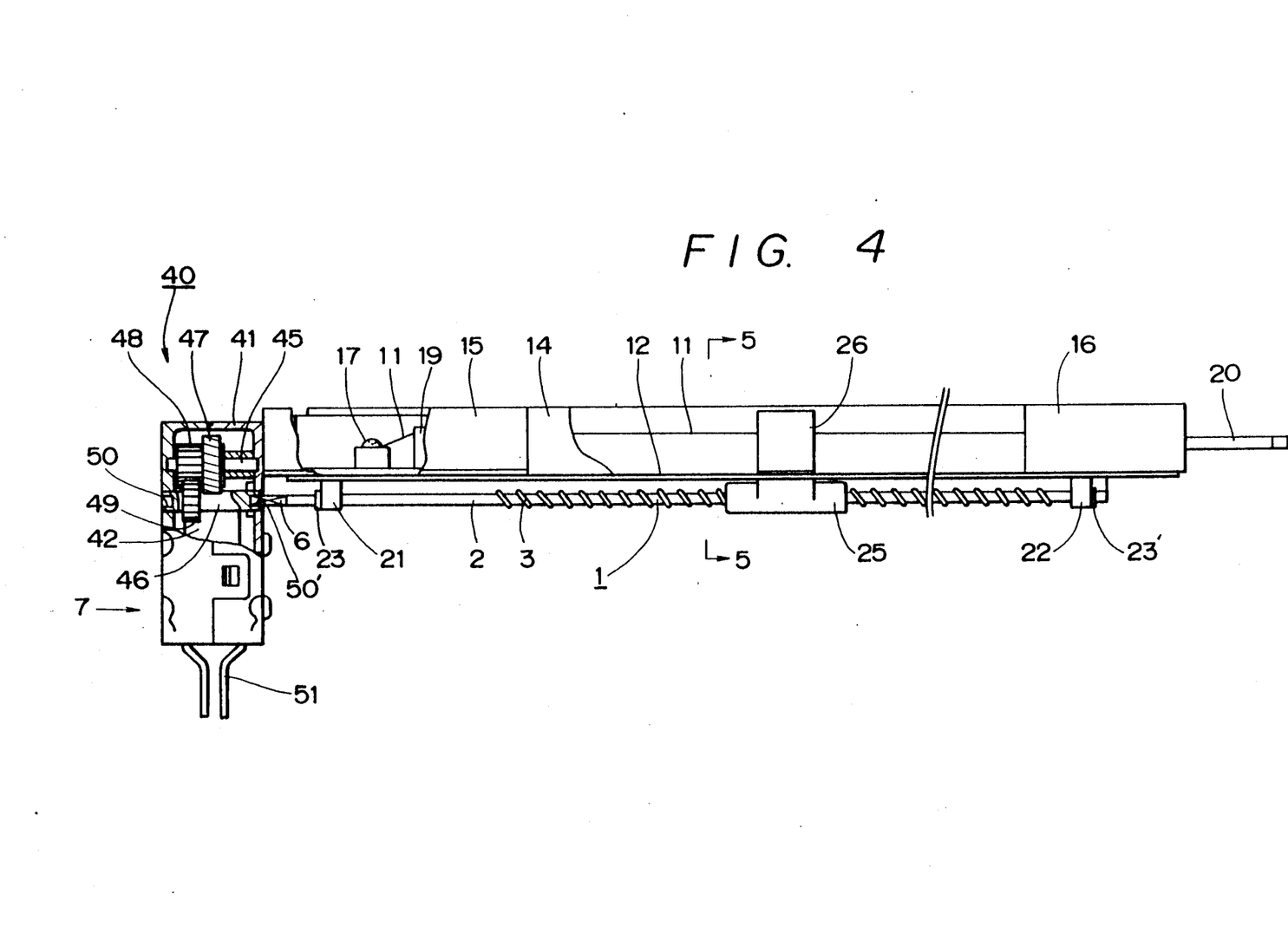
FIG. 4 is a front view depicting the apparatus to which the present invention is applied.

FIG. 3 is a plan view showing a cleaning apparatus for a wire-type static eliminator in which the above-described feed screw is employed. FIG. 4 is a front view of the apparatus, part of which is shown in a cut-off view. The wire-type static eliminator is adapted to produce a corona discharge, emitted from a fine wire 11, for removing the charge present on a photosensitive material and a transfer paper used in the electrostatic recording apparatus. The wire-type static eliminator is also used as a cleaning apparatus for removing carbon powder or the like adhered to the wire 11.

A frame 12 is formed by stamping a metal plate. The frame 12 has a groove 13, extending along the direction of the length, down the center thereof, and has side walls 14, 14'. Wire brackets 15, 16 are fixed to the two respective ends of the upper face of the frame 12. A wire 11 is mounted taut between a screw 17 provided in the left-end wire bracket 15 and a tension spring 18 provided inside the right-end wire bracket 16. The taut span of wire 11 is additionally mounted at each end by passing over V blocks 19, 19'; respectively provided on the left-end and right-end wire brackets 15, 16. A high-tension d.c. voltage is applied to the wire 11 from a plug 20 provided at the right-end bracket 16, so that a corona charge is emitted from the wire 11.

Bearings 21, 22, respectively are provided in the vicinity of the two respective ends of the lower face of the frame 12. The aforementioned feed screw 1 is rotatably supported on the bearings 21, 22. The feed screw 1 is prevented from falling off owing to the provision of snap washers 23, 23' fit into the ring-shaped grooves 4, 5. The feed nut 25 is brought into engagement with the coil-shaped spring member 3 constituting the threaded portion of the feed screw 1. A part of the feed nut 25 extends upwardly from the groove 13 of the frame 12 and a cleaner 26 is fixed to this part. The feed nut 25 and the cleaner 26 are guided in the groove 13 of the frame 12 along the axial direction thereof so as to be movable in the direction of the length of the feed screw. The cleaner 26 has an internal pad which is brought into sliding contact with the wire 11, and the wire 11 is cleaned by reciprocal motion of the pad and the wire in the direction of the length of the wire.

Figure 5:
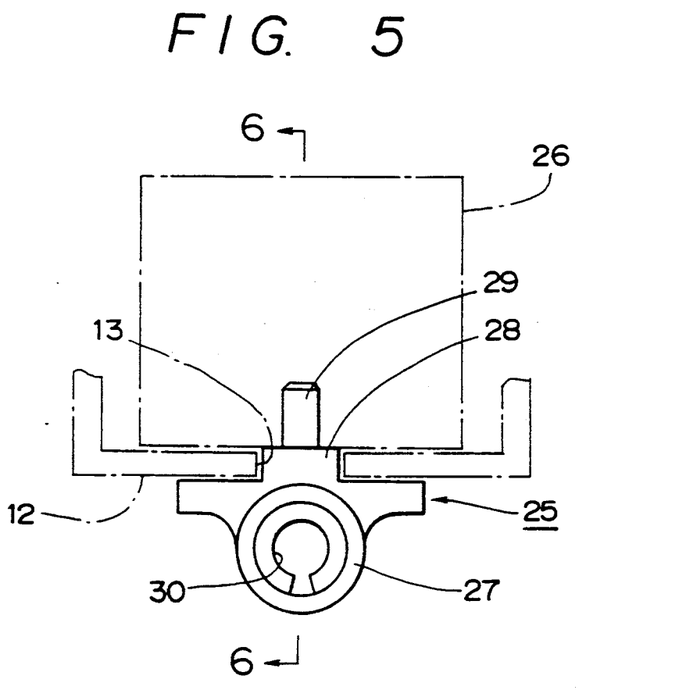
FIG. 5 is a side view showing a nut, the view corresponding to a cross-section taken along line 5—5 of FIG. 4.
Figure 6:
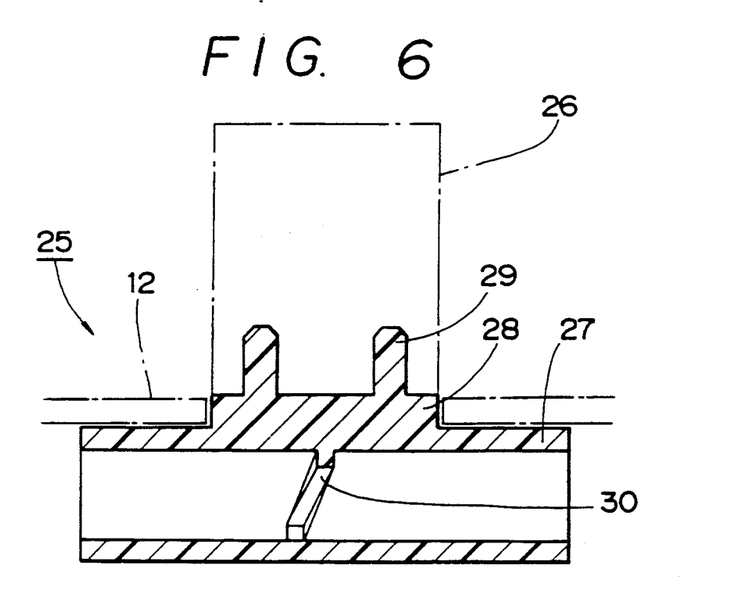
FIG. 6 is a cross-sectional view taken along line 6—6 of FIG. 5.

FIG. 5 is a side view showing the feed nut 25. FIG. 6 is a longitudinal cross-sectional view of the feed nut 25. The feed nut 25 is resin-molded and has a cylindrical hole 27 into which the feed screw 1 is inserted, a squarish projection 28 inserted into the groove 13 of the frame 12 and guided therein and thereby, and a pin 29 for fixing the cleaner 26. A helically-shaped threaded portion 30 to be brought into engagement with the coil-shaped spring member 3 by being threaded into the spiral gap made by the wire member comprising the coil, is formed in the walls of the cylindrical hole 27. The lead (pitch) of the threads in the threaded portion 30 is equal to that of the coils of the coil-shaped spring member 3 when the latter is in a free state. The number of effective turns of the threaded portion 30 of the feed nut 25 is one revolution or less. The thickness of a tooth of the threaded portion 30 is made to be slightly thinner than the ga formed by the wire members comprising the coil so that there is a suitable degree of play between the threads of the nut and the loops of the coil when the nut is being maintained in meshing engagement with the coil-shaped spring member 3.

Figure 7:
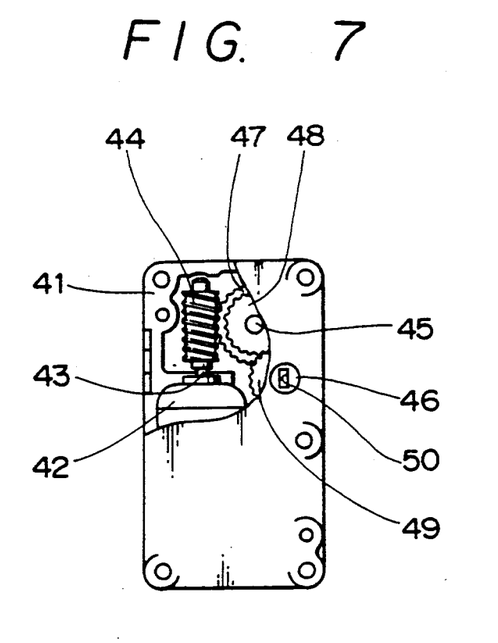
FIG. 7 is a cross-sectional view showing a drive unit as seen in the direction indicated by the arrow 7 in FIG. 4.

Referring again to FIG. 4, a drive unit 40 for rotating and driving the feed screw 1 is fixed to the left end of the frame 12. The drive unit 40 comprises a small-size D.C. motor 42 and a series of reduction gears contained in a case 41 made of resin. FIG. 7 is a side view showing the drive unit 40 as a single unit as seen from the direction indicated by the arrow 7. The motor 42 is arranged such that the output shaft 43 thereof is directed upwards. A worm gear 44 is directly connected to the output shaft 43 of the motor 42. A wheel shaft 45 and a drive shaft 46 are rotatably supported on the case 41 in parallel with the feed screw 1. A worm wheel 47 and a spur gear 48 are fixed to the wheel shaft 45, and the worm wheel 47 is maintained in meshing engagement with the worm gear 44. In addition, a spur gear 49 mounted on the drive shaft 46 is maintained in meshing engagement with the spur gear 48 fixed to the wheel shaft 45. Both end faces of the drive shaft 46 are formed so as to be visible from the outside of the case 41. Rectangular slots 50, 50' are formed in both end faces thereof. A rectangular fitting portion 6 formed in the end of the shaft of the feed screw 1 is detachably inserted and fit into the rectangular slot 50' formed in on of the end faces of the drive shaft 46, thus connecting the feed screw 1 to the drive unit 40. When the motor 42 is driven so as to rotate, its rotary motion is transmitted to the worm gear 44, the worm wheel 47 and the two spur gears 48, 49 in that order. Thereby, the rotational speed of the motor is geared down, and the drive shaft 46 is rotated and driven integrally with the feed screw 1. A lead 51 for the motor 42 leads to the outside of the case 41.

A description will now be made of the operation of the present embodiment. The feed nut 25 and the cleaner 26 can be moved linearly within the limits determined b the positions where the cleaner 26 is brought into contact with the left-end and right-end wire brackets 15 and 16 respectively, namely, the termination points of the movement in either direction of the cleaner 26, i.e., the stroke ends. The cleaner 26 stands ready for its linear movement at the home position where it is in contact with the left wire bracket 15. To clean the wire 11, the cleaner 26 is moved forward and backward alternately between the left-end and right-end wire brackets 15, 16.

When a positive voltage is first applied to the motor 42, the feed screw 1 is rotated counterclockwise. In addition, the coil-shaped spring member 3 of the feed screw 1 is maintained in meshing engagement with the threaded portion 30 defined in the feed nut 25 so that the feed nut 25 and the cleaner 26 are moved in the right-hand direction. As soon as the cleaner 26 reaches its stroke end, which is the moment it is brought into contact with the right-end wire bracket 16, an unillustrated photosensor detects the state of its arrival. Thereafter, the motor 42 is further energized for a short period on the order of 1 second long to ensure that the cleaner 26 is brought into firm contact with the right-end wire bracket 16, and this is followed by deenergization of the motor 42.

At the same time, the feed screw 1 operates in the following manner. In the vicinity of the stroke end, the feed nut 25 is maintained in meshing engagement with a portion of the coil-shaped spring member 3 adjacent to the right end thereof. Since the coil-shaped spring member 3 can freely be elastically deformed in the vicinity of the right end of the shaft the elastic deformation of the coil-shaped spring member 3 in the axial direction thereof as well as in the direction of rotation thereof permits reduction in the impact produced when the cleaner 26 collides with the right-end wire bracket 16. The counterforce produced by the impact of the collision of the cleaner 26 is transmitted from the feed screw 1 to the drive unit 40 in which the worm wheel 47 is maintained in meshing engagement with the worm gear 44, thus transmitting the counterforce as a thrust force to the output shaft 43 of the motor 42. However, since the counterforce is buffered by the action of the coil-shaped spring member 3, no excessive thrust force is exerted on the output shaft 43 of the motor 42. At the location of the stroke end where the cleaner 26 is brought into contact with the right-end wire bracket 16, the coil-shaped spring member 3 is slightly squeezed and deformed in the axial direction as well as in the counterclockwise direction, as viewed from the drive unit 40 end of the device, and then stopped in a state in which it is somewhat deformed.

Next, after half a second or so has elapsed immediately after deenergization of the motor 42, a negative voltage is applied to the motor 42 so that it starts its reverse rotation.

When the above events occur, the thrust force applied to the output shaft 43 of the motor 42 is relatively small because it is buffered by the action of the coil-shaped spring member 3 as described above. Thus, frictional force caused by the thrust force does not exceed the starting torque of the motor 42. Therefore, the motor 42 can assuredly and reliably start its reverse rotation. Further, since the urging force caused by the deformation of the coil-shaped spring member 3 in the counterclockwise direction acts in the direction in which the reverse rotation of the motor 42 is promoted, the motor 42 is easily enabled to start its reverse rotation.

The coil shaped spring member 3 is returned from a state of deformation to its original state immediately after the motor 42 has started its reverse rotation. Further, the feed nut 25 and the cleaner 26 remain stopped in a fixed position while the coil is rotating through the threaded portion of the feed nut 25 against the friction of binding. That is, the feed nut 25 and the cleaner 26 do not act on the motor 42 as a load during an initial period in which the motor 42 is being rotated until some time after it starts its reverse rotation. This means that the inertia of the reciprocating mover comprising the feed nut 25 and the cleaner 26 does not act as a load upon the motor 42 during start up but is only applied as a load to the motor 42 after the motor 42 has completed its startup and starts to rotate stably. Accordingly, the startup of the reverse rotation of the motor 42 can be effected very smoothly.

After the motor 42 is reversed, so as to start the movement of the feed nut 25 and the cleaner 26 in the left-hand direction, the cleaner 26 reaches the home position where it is brought into contact with the left-end wire bracket 15, and the unillustrated photosensor detects the state of arrival of the cleaner 26. Thereafter, the motor 42 is energized for a period of 1 second or so before being de-energized.

The operation of the feed screw 1 in this case is just the same as that of the feed screw 1 described in the case of the stroke end which is brought into contact with the right-end wire bracket 16. Thereafter, the cleaner 26 and the feed nut 25 are moved back and forth alternately the appropriate number of times, accomplishing the cleaning of the wire 11.

In the above-described embodiment, the central portion 7 of the coil-shaped spring member 3 is fixed by soldering to the center of the shaft 2 and both ends of the coil-shaped spring member 3 can freely be elastically deformed. However, the present invention is not necessarily limited to the case where only the central portion 7 is fixed to only one point of the center of the shaft 2. In other words, it is necessary only to fix the coil-shaped spring member 3 at any one of a number of locations such that the coil-shaped spring member 3 rotates integrally with the shaft 2. In addition, it is necessary only to set the coil-shaped spring member 3 so as to be in a flexible state at an essential portion such as a portion adjacent to the stroke end. Furthermore, the coil-shaped spring member 3 may be mounted on the shaft 2 with some degree of mobility, i.e., without firmly fixing the shaft 2 thereto.

In a feed screw which performs a long stroke motion, the coil-shaped spring member 3 may be fixed by soldering to various points over the entire length of the shaft 2, so that only the ends of the coil-shaped spring member 3 are freely and separately flexible. Alternatively, rather than fixing the central portion of the coil-shaped spring member 3 to the shaft 2 by soldering, both ends of the coil-shaped spring member 3 may be fixed by soldering to the shaft 2 so as to make the coil-shaped spring member 3 flexible at its central portion. The decision as to where to fix the coil-shaped spring member 3 to the shaft 2 is determined in light of the purpose of the feed screw 1 and the spring constant of the coil-shaped spring member 3.

The present invention is not necessarily limited to a cleaning apparatus for a wire type static eliminator. The present invention may be widely applied as a feed screw for any feed mechanism in which a demand for high accuracy in determining the position of the feed screw in the course of feeding process is not required, and in which the feed screw is to be employed in a manner as to bring a reciprocating mover into contact with a stopper or the like.

In the above-described embodiment, the leads or pitches of the coil-shaped spring member 3 are defined so that the coil loops are at equal intervals over its entire length. However, the coil-shaped spring member 3 may be provided with different lead (pitch) intervals as needed. The invention now having been fully described, it will be apparent to those skilled in the art that many changes and modifications can be made without departing from the spirit or scope of the invention as set forth herein.

What is claimed is:

1. A feed screw device for reciprocatively moving a nut that is in mating relation with the feed screw device within a predetermined stroke, said feed screw device comprising:
    a shaft member; and
    deformation means for absorbing a load exerted by said shaft member on the nut, and vice versa, when a thrust force is transmitted from said shaft member to the nut, and vice versa, and for urging the nut to move in a reverse direction when the nut is at the end of a stroke, said deformation means comprising:
   a coil member wound on the outer periphery of said shaft member so as to be elastically deformable in an axial direction of the shaft member by a force; and
   fixing means for fixing a portion of said coil member to said shaft member such that a free portion of said coil member, other than the portion of the coil member fixed on said shaft member, is elastically deformable in the axial direction of the shaft member.

2. A feed screw device according to claim 1, wherein said coil member is fixed at at least one axially intermediate portion thereof to said shaft member by said fixing means.

3. A feed screw device according to claim 1, wherein said coil member is fixed to the outer periphery of said shaft member by soldering.

4. A feed screw device according to claim 1, wherein said coil member is arranged so that lead angles of the coil loops thereof are equal to each other over the entire length of said coil member.

5. A feed screw device according to claim 1, wherein said coil member is fixed to said shaft member over a span of at least one turn around the circumference of said shaft member.

6. A feed screw device according to claim 1, wherein said deformation means is operable to produce a torsional deformation of said coil member, when the nut is at the end of a stroke, so as to urge the nut to move in the reverse direction.

7. A feed screw device according to claim 1, wherein said shaft member is provided with coupling means for coupling the shaft member to a drive unit for rotation of said shaft member such that the nut moves in an axial direction of the shaft member.

8. A feed screw device according to claim 7 wherein said coupling means comprises a projection extending from an end of the shaft member beyond a free end of the coil member.

9. A feed screw device according to claim 1, wherein said coil member is fixed at both ends thereof on said shaft member by said fixing means.

10. A feed screw device according to claim 1, wherein the end of a stroke of the nut is at said free portion of said coil member.

11. A nut drive mechanism having a feed screw for linearly and reciprocatively driving a nut over the length of a predetermined stroke so as to bring the nut into contact with a stopper for stopping movement thereof, said mechanism comprising:
   a shaft member rotatable in response to a driving force received from a driving unit; and
   deformation means for buffering the impact of the collision between the nut and the stopper when the nut is brought into contact with the stopper and for urging the nut to move in a reverse direction when the nut is at the end of the stroke, said deformation means comprising:
   a coil member disposed coaxially with and on the outer periphery of said shaft member; and
   fixing means for fixing an axially intermediate portion of said coil member on an intermediate portion of said shaft member such that an axial end of said coil member is elastically deformable in an axial direction of said shaft member when the nut is brought into contact with the stopper;
   wherein said nut is provided with engagement portions for engaging said coil member such that the nut moves along said shaft member in response to rotation of said shaft member.

12. A nut drive mechanism according to claim 11, wherein said coil member is arranged so that lead angles of the coil loops thereof are equal to each other over the entire length of said coil member.

13. A nut drive mechanism according to claim 11, wherein said portion of said coil member fixed to said shaft member is fixed to said shaft member over a span comprising at least one turn around the circumference of said shaft member.

14. A nut drive mechanism according to claim 11, wherein said deformation means is operable to produce a torsional deformation of said coil member, when said nut is at the end of a stroke, so as to urge the nut to move in the reverse direction.

15. A nut drive mechanism according to claim 11, wherein said coil member is fixed to the outer periphery of said shaft member by soldering.

16. A feed screw device for linearly and reciprocatively driving a nut over the length of a predetermined stroke so as to bring the nut into contact with a stopper for stopping the movement thereof, said feed screw device comprising:
   a shaft member that is formed with a portion for receiving a driving force from a driving unit and is rotatable in response to the driving force;
   deformation means for buffering the impact of the collision between the nut and the stopper and for urging the nut to move in a reverse direction when the nut is at the end of a stroke, said deformation means comprising:
   an elastically-deformable coil member disposed coaxially with and on the outer periphery of said shaft member; and
   fixing means provided between said coil member and said shaft member for fixing said coil member to said shaft such that said coil member is elastically deformable in the axial direction of the shaft member;
   whereby a rotating force is transmitted to said coil member through said fixing means when said shaft member receives the driving force thereby causing the reciprocative movement of the nut and a free end of said coil member is elastically deformed when the nut is brought into contact with the stopper thereby buffering the impact of collision between the nut and the stopper and urging the nut to move in a reverse direction.

17. A feed screw device according to claim 16, wherein said driving unit has a driving source for producing said driving force and reduction gears in meshing engagement with said driving source for transmitting the driving force to said shaft member after reduction of rotational speed by said gears.

18. A feed screw device according to claim 17, wherein said driving unit has a casing which houses said reduction gears and driving source.

19. A feed screw device according to claim 15, wherein said coil member is fixed to said shaft member over a span of at least one turn around the circumference of said shaft member.

20. A feed screw device according to claim 16, wherein said portion of said shaft member for receiving a driving force extends from a free end of said coil member to form a projection.

21. A nut drive mechanism according to claim 16, wherein said deformation means is operable to produce a torsional deformation of said coil member, when the nut is at the end of a stroke, so as to urge the nut to move in the reverse direction.

22. A feed device according to claim 16, wherein said coil member is fixed at at least one intermediate portion thereof to said shaft member by said fixing means.

* * * * *

UNITED STATES PATENT AND TRADEMARK OFFICE
CERTIFICATE OF CORRECTION

PATENT NO.   :   5,079,963
DATED        :   January 14, 1992
INVENTOR(S)  :   Nobuhiro Yamamoto; Kazunori Ikeda; Toshio Kato It is certified that error appears in the above-identified patent and that said Letters Patent is hereby corrected as shown below:

On the cover page, item [75] the inventor's name "Tosho Kato" should read --Toshio Kato--.

Signed and Sealed this

Twenty-fifth Day of May, 1993

Attest:

MICHAEL K. KIRK

*Attesting Officer*     *Acting Commissioner of Patents and Trademarks*